United States Patent
Ahn et al.

(10) Patent No.: US 11,926,127 B2
(45) Date of Patent: Mar. 12, 2024

(54) WINDOW FILM FOR DISPLAY DEVICE AND DISPLAY DEVICE INCLUDING SAME

(71) Applicants: SAMSUNG ELECTRONICS CO., LTD., Suwon-si (KR); SAMSUNG SDI CO., LTD., Yongin-si (KR)

(72) Inventors: Chanjae Ahn, Suwon-si (KR); Sun Jin Song, Seoul (KR); Won Suk Chang, Hwaseong-si (KR); Boreum Jeong, Sejong-si (KR); A Ra Jo, Suwon-si (KR); Kyeong-Sik Ju, Suwon-si (KR); Sungwon Choi, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 542 days.

(21) Appl. No.: 16/929,382

(22) Filed: Jul. 15, 2020

(65) Prior Publication Data
US 2021/0016552 A1    Jan. 21, 2021

(30) Foreign Application Priority Data
Jul. 15, 2019 (KR) .......................... 10-2019-0085348

(51) Int. Cl.
| B32B 27/34 | (2006.01) |
| B32B 27/08 | (2006.01) |
| B32B 27/28 | (2006.01) |
| C08G 69/26 | (2006.01) |

(Continued)

(52) U.S. Cl.
CPC .............. *B32B 27/34* (2013.01); *B32B 27/08* (2013.01); *B32B 27/283* (2013.01);
(Continued)

(58) Field of Classification Search
CPC ....... B32B 27/34; B32B 27/08; B32B 27/283; B32B 2307/412; B32B 2307/536;
(Continued)

(56) References Cited

U.S. PATENT DOCUMENTS

| 5,922,104 A | 7/1999 | Park et al. |
| 2009/0214871 A1* | 8/2009 | Fukuda ............... C08B 37/0051 |
| | | 428/521 |

(Continued)

FOREIGN PATENT DOCUMENTS

| JP | 2015013986 A | 1/2015 |
| KR | 0184379 | 12/1998 |

(Continued)

OTHER PUBLICATIONS

Machine translation of JP 2015-013986. (Year: 2015).*

*Primary Examiner* — John D Freeman
(74) *Attorney, Agent, or Firm* — CANTOR COLBURN LLP

(57) ABSTRACT

Disclosed is a window film for a display device including a light transmitting substrate including a polyamide including a structural unit represented by Chemical Formula 1 and a structural unit represented by Chemical Formula 2, and a hard coating layer laminated on one surface of the light transmitting substrate:

(Chemical Formula 1)

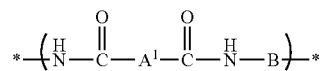

(Chemical Formula 2)

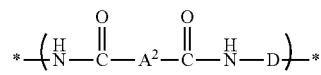

in Chemical Formula 1 and Chemical Formula 2, each of $A^1$, $A^2$, B, and D is the same as defined in the detailed description.

20 Claims, 1 Drawing Sheet

(51) Int. Cl.
*C08G 69/42* (2006.01)
*C08J 7/04* (2020.01)
*C08J 7/046* (2020.01)
*G02B 1/14* (2015.01)

(52) U.S. Cl.
CPC ........... *C08G 69/265* (2013.01); *C08G 69/42* (2013.01); *C08J 7/0427* (2020.01); *C08J 7/046* (2020.01); *G02B 1/14* (2015.01); *B32B 2307/412* (2013.01); *B32B 2307/536* (2013.01); *B32B 2457/20* (2013.01); *C08J 2377/06* (2013.01); *C08J 2483/04* (2013.01)

(58) Field of Classification Search
CPC ..... B32B 2457/20; B32B 7/023; B32B 27/28; C08J 7/0427; C08J 7/046; C08J 2377/06; C08J 2379/08; C08J 2483/04; G02B 1/14; G06F 1/1652; G09F 9/301; C08G 69/48; C08G 69/265; C08G 69/42
See application file for complete search history.

(56) References Cited

U.S. PATENT DOCUMENTS

| | | | |
|---|---|---|---|
| 2016/0075913 A1 | 3/2016 | Sun et al. | |
| 2017/0121460 A1 | 5/2017 | Hong et al. | |

FOREIGN PATENT DOCUMENTS

| | | |
|---|---|---|
| KR | 1020160030862 A | 3/2016 |
| KR | 20170051358 A | 5/2017 |

\* cited by examiner

【FIG. 1】
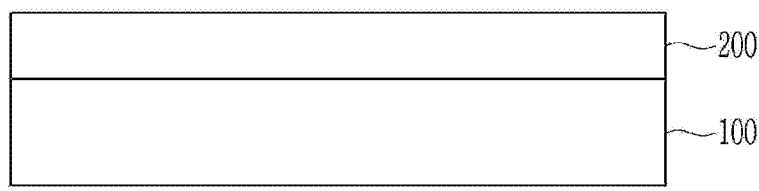
【FIG. 2】
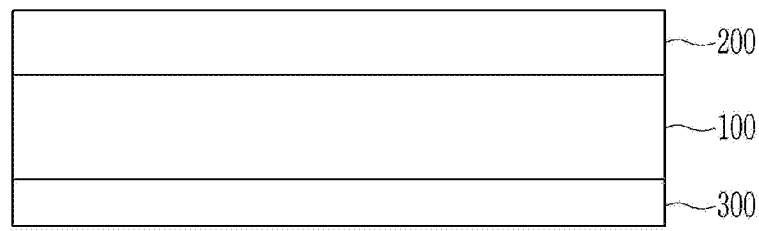
【FIG. 3】
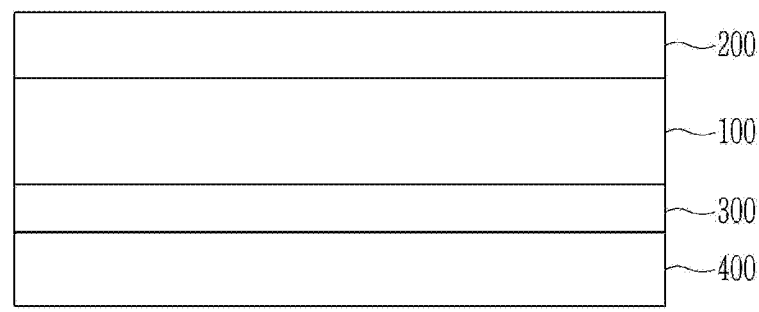

WINDOW FILM FOR DISPLAY DEVICE AND DISPLAY DEVICE INCLUDING SAME

CROSS-REFERENCE TO RELATED APPLICATION

This application claims priority to and the benefit of Korean Patent Application No. 10-2019-0085348 filed in the Korean Intellectual Property Office on Jul. 15, 2019, the entire contents of which are incorporated herein by reference.

BACKGROUND

1. Field

A window film for a display device and a display device including the window film are disclosed.

2. Description of the Related Art

Portable display devices such as a smart phone or a tablet PC have been actively researched according to the high performance and popularization thereof. For example, lightweight flexible (i.e., bendable or foldable) portable display devices have been studied and developed to be commercialized. The portable display device of a liquid crystal display or the like includes a protective window for protecting a display module such as a liquid crystal layer. Currently, most portable display devices include a window including a rigid glass substrate. However, glass is fragile to exterior impacts, so it is easily broken when applied to a potable display device or the like and also glass is not flexible, so it may not be suitable for a flexible display device. Therefore, it has been attempted to substitute a protective window with a plastic film in a display device. However, a plastic film is needed that has combination of improved mechanical properties such as hardness and optical properties in order to be applied for the protective window in a display device and simultaneously to have high appearance quality.

SUMMARY

An embodiment provides a window film for a display device having a low refractive index and improved wavelength dispersion properties due to a high Abbe's number, and thus, having improved optical properties.

Another embodiment provides a display device including the window film for the display device having improved optical properties.

An embodiment provides a window film for a display device including a light transmitting substrate including a polyamide including a structural unit represented by Chemical Formula 1 and a structural unit represented by is Chemical Formula 2 and a hard coating layer laminated on one surface of the light transmitting substrate:

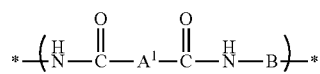

(Chemical Formula 1)

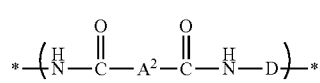

(Chemical Formula 2)

In Chemical Formula 1 and Chemical Formula 2, $A^1$ and $A^2$ are each independently a C4 to C10 cycloalkylene group, or a group in which two C4 to C10 cycloalkylene groups are linked by a single bond, B of Chemical Formula 1 is a substituted or unsubstituted phenylene group, or a group in which two or more substituted or unsubstituted phenylene groups are linked by a single bond, and D of Chemical Formula 2 is a group in which two or more substituted or unsubstituted phenylene groups are linked by —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof.

$A^1$ and $A^2$ of Chemical Formula 1 and Chemical Formula 2 may each independently be a single cyclohexylene group, a group in which two cyclohexylene groups are linked by a single bond, or a decahydronaphthalenylene group.

B of Chemical Formula 1 may be a group including two phenylene groups that are linked by a single bond, and each of the two phenylene groups is substituted by an electron withdrawing group.

B of Chemical Formula 1 may be represented by the following chemical formula:

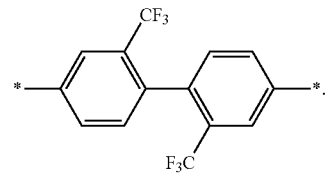

D of Chemical Formula 2 may be a group in which two or more substituted or unsubstituted phenylene groups are linked by —O—, —SO$_2$—, —(CH$_2$)$_p$—, —(CF$_2$)$_q$—, —C(C$_n$H$_{2n+1}$)$_2$—, —C(C$_n$F$_{2n+1}$)$_2$— (wherein 1≤n≤10, 1≤p≤10, and 1≤q≤10), or a combination thereof.

D of Chemical Formula 2 may be a group represented by the following chemical formula:

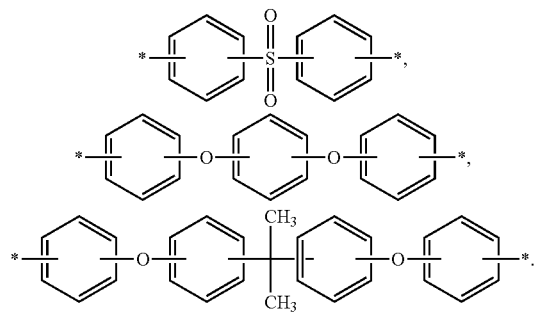

The structural unit represented by Chemical Formula 1 in the polyamide may be present in an amount of greater than or equal to about 50 mol % and less than or equal to about 90 mol % based on a total mole number of the structural unit represented by Chemical Formula 1 and the structural unit represented by Chemical Formula 2.

The structural unit represented by Chemical Formula 1 in the polyamide may be present in an amount of greater than or equal to about 60 mol % and less than or equal to about 80 mol % based on a total mole number of the structural unit represented by Chemical Formula 1 and the structural unit represented by Chemical Formula 2.

The light transmitting substrate may have a refractive index of greater than or equal to about 1.60 and less than about 1.66 and an Abbe's number of greater than or equal to about 20.

The light transmitting substrate may have an average transmittance in a wavelength range of about 360 nm to about 740 nm of greater than or equal to about 88%.

The light transmitting substrate may have an elastic modulus of greater than or equal to about 3 GPa.

The light transmitting substrate may have a glass transition temperature of greater than or equal to about 300° C.

The hard coating layer may include an acrylate-based polymer, a urethane-based polymer, an epoxy-based polymer, a silicon-based polymer, polycaprolactone, a urethane-acrylate copolymer, polyrotaxane, a silica-containing inorganic hard coating material, or a combination thereof.

The hard coating layer may include a silicon-based polymer and the silicon-based polymer may include organopolysiloxane.

The light transmitting substrate may have a thickness of about 10 μm to about 300 μm.

The hard coating layer may have a thickness of about 1 μm to about 30 μm.

The window film may further include a rear coating layer on the other surface of the light transmitting substrate on which the hard coating layer is not laminated.

The window film may have an average transmittance in a wavelength range of about 360 nm to about 740 nm of greater than or equal to about 90%.

A display device according to another embodiment includes the window film according to an embodiment.

The display device may be a flexible display device.

The window film for the display device according to an embodiment includes a light transmitting substrate and a hard coating layer laminated on one surface of the light transmitting substrate having improved wavelength dispersion properties, low refractive index, and high transmittance to improve optical properties. Thus, it may exhibit excellent mechanical properties and optical properties and visibility is improved to exhibit excellent appearance quality, and thereby may be usefully used as a window of a flexible display device, and the like.

BRIEF DESCRIPTION OF THE DRAWINGS

FIG. 1 is a view showing a schematic cross-section of a window film including a light transmitting substrate 100 and a hard transmitting layer 200 laminated on one surface of a light transmitting substrate 100 according to an exemplary embodiment, FIG. 2 is a view showing a schematic cross-section of a window film including a light transmitting substrate 100, a hard coating layer 200, and further including a rear coating layer 300 laminated on the other surface of the light transmitting substrate 100 on which the hard coating layer 200 are not laminated, according to another exemplary embodiment, and FIG. 3 is a view showing a schematic cross-section of a window film according to another exemplary embodiment further including an adhesive or a superelastic layer 400 under the rear coating layer 300 of the window film of FIG. 2.

DETAILED DESCRIPTION

The embodiments of the present disclosure will be described in detail. However, these embodiments are exemplary, the present disclosure is not limited thereto and the present disclosure is defined by the scope of claims.

It will be understood that when an element is referred to as being "on" another element, it can be directly on the other element or intervening elements may be present therebetween In contrast, when an element is referred to as being "directly on" another element, there are no intervening elements present It will be understood that, although the terms "first," "second," "third" etc. may be used herein to describe various elements, components, regions, layers and/or sections, these elements, components, regions, layers and/or sections should not be limited by these terms These terms are only used to distinguish one element, component, region, layer or section from another element, component, region, layer or section Thus, "a first element," "component," "region," "layer" or "section" discussed below could be termed a second element, component, region, layer or section without departing from the teachings herein. The terminology used herein is for the purpose of describing particular embodiments only and is not intended to be limiting. As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise.

"Or" means "and/or." As used herein, the term "and/or" includes any and all combinations of one or more of the associated listed items It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures It will be understood that relative terms are intended to encompass different orientations of the device in addition to the orientation depicted in the Figures For example, if the device in one of the figures is turned over, elements described as being on the "lower" side of other elements would then be oriented on "upper" sides of the other elements The exemplary term "lower," can therefore, encompasses both an orientation of "lower" and "upper," depending on the particular orientation of the figure Similarly, if the device in one of the figures is turned over, elements described as "below" or "beneath" other elements would then be oriented "above" the other elements The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments As such, variations from the shapes of the illustrations as a result, for example, of manufacturing techniques and/or tolerances, are to be expected Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features Moreover, sharp angles that are illustrated may be rounded Thus, the regions illustrated in the figures are schematic in nature and their shapes are not intended to illustrate the precise shape of a region and are not intended to limit the scope of the present claims.

As used herein, when specific definition is not otherwise provided, "substituted" refers to replacement of at least one hydrogen of a given functional group by a substituent selected from a halogen atom (F, Cl, Br, or I), a hydroxy group, a nitro group, a cyano group, an amino group ($-NH_2$, $-NH(R^{100})$, or $-N(R^{101})(R^{102})$, wherein $R^{100}$, $R^{101}$, and $R^{102}$ are the same or different, and are each independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group (e.g., cycloalkyl group, etc.), a substituted or unsubstituted aryl group (e.g., benzyl group, naphthyl group, fluorenyl group, etc.), a substituted or unsubstituted alkenyl group, a substituted or unsubstituted alkynyl group, a substituted or unsubstituted heteroaryl group and a substituted or unsubstituted heterocyclic group, or the substituents may be linked to each other to form a ring.

As used herein, when specific definition is not otherwise provided, "alkyl group" refers to a C1 to C30 alkyl group, and specifically a C1 to C15 alkyl group, "cycloalkyl group" refers to a C3 to C30 cycloalkyl group, and specifically a C3 to C18 cycloalkyl group, "alkoxy group" refers to a C1 to C30 alkoxy group, and specifically a C1 to C18 alkoxy group, "ester group" refers to a C2 to C30 ester group, and specifically a C2 to C18 ester group, "ketone group" refers to a C2 to C30 ketone group, and specifically a C2 to C18 ketone group, "aryl group" refers to a C6 to C30 aryl group, and specifically a C6 to C18 aryl group, and "alkenyl group" refers to a C2 to C30 alkenyl group, and specifically a C2 to C18 alkenyl group.

As used herein, when specific definition is not otherwise provided, the term "combination" refers to mixing or copolymerization. Herein, "copolymerization" refers to a random copolymerization, a block copolymerization, or a graft copolymerization.

As used herein, the term "polyimide" refers to "polyimide", "polyamic acid" and a combination thereof as well as "polyimide" itself. The terms "polyimide" and "polyamic acid" may be used to have the same meanings.

In addition, as used herein, "*" refers to a portion of attachment to other atom or other chemical formula.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it may be directly on the other element or intervening elements may also be present. In contrast, when an element is referred to as being "directly on" another element, there are no intervening elements present.

An embodiment provides a window film for a display device that may be used as a cover window protecting a display device such as a flexible display device or a foldable display device.

A glass substrate has been conventionally used for protecting the display device, but when requiring flexible and foldable characteristics of freely bending a shape, it is necessary to use a plastic material having hardness and strength as a window of a display device and also having light transmittance, color or the like similar to those of the glass substrate so as to function as a display device. A cover window for a display device requires high appearance quality as well as high optical characteristics, durability, and flexural property.

A polyimide-based transparent film that has high durability and heat resistance as a plastic material and satisfies optical characteristics to some extent has been studied. Further, a laminated film including a hard coating layer added on a polyimide or poly(amide-imide) substrate in order to obtain a high hardness similar to that of glass has been attempted. However, due to the lamination of the two layers having different refractive indices, an interference phenomenon may occur, and a difference in a thickness and refractive index of each layer may deepen the interference phenomenon and may cause a strong rainbow phenomenon on the film surface. Even though the inherent characteristics of the material, such as refractive index, are the same, a thickness deviation may occur or the material may partially be mixed in the whole film as a result of a film forming process, a coating process, etc., which may modify the rainbow phenomenon. The rainbow phenomenon of an optical film is a phenomenon in which a reflectance varies or the viewing angle changes depending on a position of the wide region of the film, which may be observed with the naked eye.

In an effort to prevent interface interference due to a difference in refractive index between a polyimide or poly (amide-imide) substrate and a hard coating layer, a laminated film including an optical enhancement layer has been proposed wherein the optical enhancement layer includes a copolymer of polyimide and is disposed between the polyimide or poly(amide-imide) substrate and a hard coating layer or disposed to face a hard coating layer via a polyimide or poly(amide-imide) substrate present therebetween. Because the laminated film has an average amplitude less than or equal to 0.1% in a visible region when a reflectance of the laminated film is measured at an incident angle of 45 degrees after attaching the laminated film to a black reflector, the surface rainbow phenomenon is minimized or eliminated, resulting in improved optical characteristics and visibility. However, such a laminated film requires a process of separately manufacturing and laminating a polyimide or poly (amide-imide) substrate film and an optical enhancement layer film, and thus, the manufacturing process may be complicated and manufacturing costs may increase.

The present inventors have developed a light transmitting substrate that is produced as a single film, and thus does not require a lamination process, and has a lower refractive index, no interference due to a difference of a refractive index from that of the hard coating layer laminated thereon, improved wavelength dispersion properties, improved optical characteristics due to high transmittance and low yellowness, and excellent mechanical properties required as a window for a display device. Accordingly, the window film for the display device according to an embodiment includes a light transmitting substrate including a polyamide and a hard coating layer laminated on one surface of the light transmitting substrate, wherein the polyamide includes a structural unit represented by Chemical Formula 1 and a structural unit represented by Chemical Formula 2:

(Chemical Formula 1)
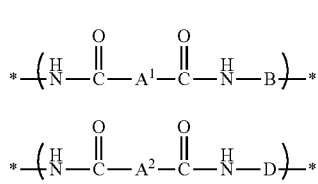

(Chemical Formula 2)
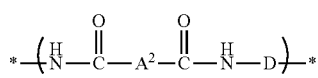

In Chemical Formula 1 and Chemical Formula 2, $A^1$ and $A^2$ are each independently a C4 to C10 cycloalkylene group, or a group in which two C4 to C10 cycloalkylene groups are linked by a single bond, B of Chemical Formula 1 is a substituted or unsubstituted phenylene group, or a group in which two or more substituted or unsubstituted phenylene groups are linked by a single bond, and D of Chemical Formula 2 is a group in which two or more substituted or unsubstituted phenylene groups are linked by —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof.

As shown in Chemical Formula 1 and Chemical Formula 2, in each structural unit of the polyamide forming the light transmitting substrate of the window film for the display device according to an embodiment, $A^1$ and $A^2$ between two amide bonds may each independently include at least one C4 to C10 cycloalkylene group, for example, a single cyclohexylene group, two cyclohexylene groups linked by a single bond, or a decahydronaphthalenylene group in which two cyclohexylene groups are condensed.

Not wishing to be bound by theory, the cycloalkylene groups do not include pi (π) bonds and therefore, have the effect of preventing the diffusion of electron clouds in the polymer chain, so that the refractive index of the polyamide film produced therefrom may be lowered, wavelength dispersion properties may be decreased, and transparency may be increased by including such alicyclic groups in all structural units. In an embodiment, $A^1$ and $A^2$ may be all cyclohexylene groups. The cyclohexylene groups may include cis or trans stereoisomer structures, and in an embodiment, the cyclohexylene group may be all trans.

In addition, in the structural unit represented by Chemical Formula 1, B is a single substituted or unsubstituted phenylene group, or a group in which substituted or unsubstituted two or more phenylene groups are linked by a single bond. When B of Chemical Formula 1 is one of the aforementioned groups, it forms a rigid structure, and thus may help to increase mechanical properties and heat resistance of the polyamide film prepared therefrom. In an embodiment, the at least one phenylene group may be substituted with an electron withdrawing group, for example, a halogen (—F, —Cl, —Br, —I), a haloalkyl group, a cyano group, or a nitro group. By being substituted with such groups, it may also help to increase transparency of the film by suppressing diffusion of electron clouds in the polymer structure. In an embodiment, B of Chemical Formula 1 may be represented by the following chemical formula:

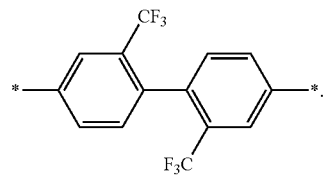

D of Chemical Formula 2 also includes at least two substituted or unsubstituted phenylene groups, wherein the at least two phenylene groups are linked by the aforementioned specific linking groups, rather than a single bond. As described above, the polyamide includes alicyclic groups in all structural units, and polyamides including these alicyclic groups may have low dissolution in organic solvents. In order to solve this problem, D in the structural unit represented by Chemical Formula 2 has a structure in which two or more phenylene groups are linked by a specific linking group rather than a single bond so that it may have a less rigid structure than B in the structural unit represented by Chemical Formula 1. D in the structural unit represented by Chemical Formula 2 has a somewhat flexible structure, while improving mechanical properties of the polymer by including the phenylene groups, which are aromatic ring groups. In an embodiment, D may be a group in which two or more substituted or unsubstituted phenylene groups are linked by —O—, —SO$_2$—, —(CH$_2$)$_p$—, —(CF$_2$)$_q$—, —C(C$_n$H$_{2n+1}$)$_2$—, —C(C$_n$F$_{2n+1}$)$_2$— (wherein 1≤n≤10, 1≤p≤10, and 1≤q≤10), or a combination thereof. For example, D of Chemical Formula 2 may be a group in which two, three, or four phenylene groups are linked to each other by —O—, SO$_2$—, —C(CH$_3$)$_2$—, or a combination thereof. In an embodiment, D of Chemical Formula 2 may be one of the groups represented by the following chemical formulae:

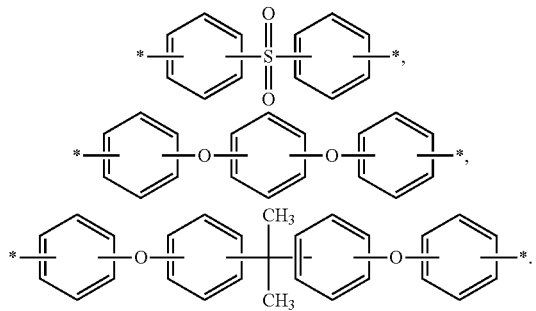

In an embodiment, the structural unit represented by Chemical Formula 1 in the polyamide may be included in an amount of greater than or equal to about 50 mol % and less than or equal to about 90 mol %, for example, greater than or equal to about 50 mol % and less than or equal to about 85 mol %, greater than or equal to about 50 mol % and less than or equal to about 80 mol %, greater than or equal to about 55 mol % and less than or equal to about 80 mol %, greater than or equal to about 60 mol % and less than or equal to about 80 mol %, greater than or equal to about 65 mol % and less than or equal to about 80 mol %, greater than or equal to about 65 mol % and less than or equal to about 75 mol %, or about 70 mol % based on a total mole number of the structural unit represented by Chemical Formula 1 and the structural unit represented by Chemical Formula 2.

When the content range of the structural unit represented by Chemical Formula 1 and the structural unit represented by Chemical Formula 2 in the polyamide is within the foregoing ranges, a film can more easily be formed including the polyamide, and the prepared film has excellent optical properties, mechanical properties, and high heat resistance.

For example, the polyamide may have high transmittance of greater than or equal to about 88%, for example, greater than or equal to about 88.5%, greater than or equal to about 89%, or greater than or equal to about 89.5% in a wavelength range of about 360 nm to about 740 nm.

In addition, a refractive index of the polyamide may be less than about 1.66, for example, less than or equal to about 1.65, less than or equal to about 1.64, about 1.62 to about 1.64 which is lower refractive index than that of the polyimide (i.e., about 1.65 to about 1.70).

In addition, the Abbe's number of the polyamide may be greater than or equal to about 20, for example, greater than or equal to about 21, greater than or equal to about 22, greater than or equal to about 23, or greater than or equal to about 24, and thus, optical dispersion properties depending on a wavelength of the polyamide may be lowered compared to those of a polyimide or a poly(amide-imide) copolymer.

Abbe's number is an index of optical dispersion properties and as the Abbe's number becomes higher, the optical dispersion properties may be lowered. The Abbe's number of glass is about 65.4, and the Abbe's number of a hard coating layer is about 111.5, which is very high. In these substrates having high Abbe's numbers, the degree of light dispersion depending on a wavelength is low, so that objects or images viewed through them are clearly visible without dispersion. On the other hand, the Abbe's number of poly (amide-imide) is very low at about 16.0, and the Abbe's number of the film laminated with a hard coating layer on polyimide is about 20.4, showing that polyimide or poly (amide-imide) has a high wavelength dispersion properties. Compared with these polyimide or poly(amide-imide) copolymers, the Abbe's number of the polyamide is higher and, therefore, it has lower wavelength dispersion properties.

An elastic modulus of the polyamide may be greater than or equal to about 3 GPa, for example, greater than or equal to about 3.3 GPa, greater than or equal to about 3.5 GPa, greater than or equal to about 3.6 GPa, greater than or equal to about 3.7 GPa, or greater than or equal to about 4.0 GPa. As described above, the Abbe's number of the hard coating layer is very high, but its mechanical properties are significantly lower than those of the polyamide, polyimide, or poly(amide-imide). In addition to the hard coating layer, mechanical properties of other polymers having high Abbe's numbers, for example, polyethyleneterephthalate (PET), triacetyl cellulose (TAC), and the like are very low. Therefore, it is difficult to realize high mechanical properties and high Abbe's numbers simultaneously.

In addition, a glass transition temperature greater than or equal to about 300° C., for example greater than or equal to about 310° C., greater than or equal to about 320° C., or greater than or equal to about 330° C., shows that the polyamide has excellent heat resistance.

As described above, in the window film according to an embodiment, the Abbe's number of the light transmitting substrate without the hard coating layer is greater than or equal to about 20, and in itself, is greater than the Abbe's number of a film laminated with the hard coating layer on polyimide. The Abbe's number of the window film according to an embodiment in which the hard coating layer having the very high Abbe's number is laminated on the light transmitting substrate will have a significantly higher Abbe's number than the Abbe's number of a film in which the hard coating layer is laminated on the polyimide or poly(amide-imide). In addition, as described above, the refractive index of the polyamide is lower than the refractive index of the polyimide. Therefore, the window film for a display device according to an embodiment in which a hard coating layer is laminated on a light transmitting substrate including the polyamide exhibits reduced interface interference due to a difference in refractive indices between layers compared with a conventional window for a display device including a polyimide or poly(amide-imide) copolymer as a light transmitting substrate, thereby improving optical properties and visibility.

In addition, the window film for a display device including polyamide according to an embodiment as a light transmitting substrate may include the polyamide alone as a light transmitting substrate, and thus, the manufacturing process for a window for a display device avoids a cumbersome process such as a lamination process.

The polyamide including the structural unit represented by Chemical Formula 1 and the structural unit represented by Chemical Formula 2 may be prepared by reacting a dicarboxylic acid derivative including a cycloalkylene group corresponding to $A^1$ and $A^2$ of Chemical Formula 1 and Chemical Formula 2, with a diamine including at least one substituted or unsubstituted phenylene group, respectively corresponding to B of Chemical Formula 1 and D of Chemical Formula 2, according to polyamide polymerization methods well known to those skilled in the art.

The polyamide polymerization methods well known to those skilled in the art may include, for example, a low temperature solution polymerization, an interface polymerization, a melt polymerization, a solid-phase polymerization, and the like. Among them, the low temperature solution polymerization method produces the polyamide by reacting carboxylic acid dichloride as the dicarboxylic acid derivative with the diamine in an aprotic polar organic solvent.

Examples of the carboxylic acid dichloride that may be used as the dicarboxylic acid derivative may include 1,4-cyclohexane dicarboxylic acid chloride, 1,3-cyclohexane dicarboxylic acid chloride, 2,6-decalin dicarboxylic acid chloride, and the like, but are not limited thereto. In an embodiment, the carboxylic dichloride may be 1,4-cyclohexane dicarboxylic acid chloride.

The diamine including B in the structural unit represented by Chemical Formula 1 may be, for example, 4,4'-diaminobenzene, benzidine, 3,3',5,5'-tetramethylbenzidine, 2,2'-dimethyl-4,4'-diaminobiphenyl (m-t), 2,2'-ditrifluoromethyl-4,4'-diaminobiphenyl (TFDB), or the like which are substituted with an electron withdrawing group, but is not limited to thereto. In an embodiment, the diamine may be TFDB.

The diamine including D in the structural unit represented by Chemical Formula 2 may be, for example, 4,4'-diaminodiphenylether, 3,4'-diaminodiphenylether, 4,4'-diaminodiphenylsulfone (4-APS), 3,3'-diaminodiphenylsulfone, bis[4-(4-aminophenoxy) phenyl]sulfone, bis[3-(3-aminophenoxy) phenyl]sulfone, bis[4-(3-aminophenoxy) phenyl]sulfone, 1,3-bis(4-aminophenoxy)benzene (TPE-R), 2,2-bis(4-aminophenyl) hexafluoropropane, 2,2-bis[4-(4-aminophenoxy) phenyl]propane (BAPP), or the like, but is not limited to thereto. In an embodiment, the diamine may be 4-APS, BAPP, TPE-R, or a combination thereof.

The aprotic polar solvent may be, for example, a sulfoxide based solvent such as dimethylsulfoxide, diethyl sulfoxide, and the like, a formamide based solvent such as N,N-dimethyl formamide, N,N-diethyl formamide, and the like, an acetamide based solvent such as N,N-dimethyl acetamide, N,N-diethylacetamide, and the like, a pyrrolidone based solvent such as N-methyl-2-pyrrolidone, N-vinyl-2-pyrrolidone, and the like, a phenol based solvent such as phenol, o-, m-, or p-cresol, xylenol, halogenated phenol, catechol, and the like, or hexamethylphosphoramide, γ-butyrolactone, and the like. These may be included alone or as a mixture. Alternatively, aromatic hydrocarbons such as xylene and toluene may be used. In addition, salts having up to 50 mass % of an alkali metal, or an alkaline-earth metal, may be added to the solvent to facilitate dissolution of the polymer.

The polyamide prepared as described above may be produced as a light transmitting substrate in the form of a film by coating and casting a solution including the same on any support and then removing the solvent and curing the solution.

Meanwhile, in the window film for a display device according to an embodiment, the hard coating layer laminated on one surface of the light transmitting substrate including the polyamide may include any hard coating layer material which is known to be used to produce a window for a display device by those skilled in the art. The hard coating layer may increase the surface hardness of the window for a display device.

As a material of the hard coating layer, a material that is cured by heat or light may be used, for example, an acrylate-based polymer, a urethane-based polymer, an epoxy-based polymer, a silicone-based polymer, polycaprolactone, a urethane-acrylate copolymer, polyrotaxane, a silica-containing inorganic hard coating material, and the like, but is not limited thereto.

The acrylate-based polymer may be a polymer of a monomer mixture including a multi-functional acrylate monomer. Examples of the multi-functional acrylate monomer may be trimethylolpropane triacrylate (TMPTA), trimethylolpropane ethoxy triacrylate (TMPEOTA), glycerol propoxylated triacrylate (GPTA), pentaerythritol tetraacrylate (PETA), and dipentaerythritol hexaacrylate (DPHA), but are not limited thereto. The urethane-based or acrylate-based polymer and the multi-functional acrylate material may exhibit excellent adherence and high productivity.

In an embodiment, the hard coating layer may include the silicon-based polymer and the silicon-based polymer may include organopolysiloxane such as silsesquioxane.

The hard coating layer may be laminated to one surface of the light transmitting substrate by any method known to those skilled in the art. For example, the hard coating layer may be produced by coating and curing a coating liquid for forming a hard coating layer on the light transmitting substrate. Alternatively, the hard coating layer may be made as a separate film and then adhered to one surface of the light transmitting substrate using an adhesive or the like.

The method of preparing a solution for forming a hard coating layer is not particularly limited, and a polymer solution that is available as a hard coating material may be prepared using a method well known to those skilled in the art, or a commercially available material may be used. For example, when the hard coating layer includes a siloxane-based polymer, a polysiloxane may be prepared by a dehydration condensation reaction of a silane compound in a solvent, and a hard coating solution including the polysiloxane prepared therefrom may be used as a solution forming a hard coating layer. Alternatively, when the hard coating layer includes an acrylate-based polymer, a commercially available acrylate polymer may be dissolved in an appropriate solvent or an acrylate monomer may be polymerized to prepare an acrylate-based polymer solution. Since all of these methods are well known to those skilled in the art, detailed descriptions thereof will be omitted.

In an embodiment, a thickness of the light transmitting substrate may be about 10 μm to about 300 μm, for example, about 15 μm to about 300 μm, about 20 μm to about 300 μm, about 25 μm to about 300 μm, about 30 μm to about 300 μm, about 30 μm to about 250 μm, about 30 μm to about 200 μm, about 30 μm to about 150 μm, about 30 μm to about 100 μm, about 30 μm to about 80 μm, about 30 μm to about 70 μm, about 30 μm to about 60 μm, about 35 μm to about 60 μm, or about 35 μm to about 55 μm, but is not limited thereto.

In an embodiment, a thickness of the hard coating layer may be less than or equal to about 50 μm, for example about 1 μm to about 50 μm, about 1 μm to about 40 μm, about 1 μm to about 30 μm, about 3 μm to about 30 μm, about 5 μm to about 30 μm, about 5 μm to about 25 μm, about 5 μm to about 20 μm, about 5 μm to about 15 μm, or about 5 μm to about 10 μm, but is not limited thereto.

In the window film for a display device including the light transmitting substrate and the hard coating layer according to an embodiment, the light transmitting substrate has a higher Abbe's number and a lower refractive index as it includes the aforementioned polyamide, and may reduce interface interference and thus improve visibility due to a reduced difference of a refractive index from that of the hard coating layer. In addition, by including the hard coating layer, the transmittance in the wavelength range of about 360 nm to about 740 nm of the window for a display device may be greater than or equal to about 90%.

In an embodiment, the window film for a display device may further include a rear coating layer on the other surface of the light transmitting substrate on which the hard coating layer is not laminated.

The rear coating layer may include any material as long as it may be optically colorless and transparent, may adhere well to the adhesive layer or superelastic layer for adhering the window film for a display device according to an embodiment to the surface of the display device, and may maintain flexural characteristics of the window film according to an embodiment. For example, the rear coating layer may include the same material as the hard coating layer, and may include any materials used for the conventional hard coating layer for a window for a display device without limitations. For example, the rear coating layer may include a (meth)acrylate-based polymer, polycaprolactone, a urethane-acrylate copolymer, polyrotaxane, an epoxy resin, a siloxane copolymer, a perfluoropolyether, or a combination thereof.

A thickness of the rear coating layer may be about 30 nm to about 300 nm, for example about 40 nm to about 200 nm, about 50 nm to about 180 nm, about 60 nm to about 150 nm, about 70 nm to about 130 nm, about 80 nm to about 120 nm, or about 90 nm to about 120 nm, and the rear coating layer may be formed in a relatively thinner thickness than the thin hard coating layer.

A refractive index of the rear coating layer may be less than or equal to about 1.7, for example, less than or equal to about 1.6, less than or equal to about 1.5, less than or equal to about 1.4, or less than or equal to about 1.3.

Hereinafter, referring to FIGS. 1 to 3, various embodiments of a window film for a display device according to an embodiment will be described.

FIG. 1 is a view showing a schematic cross-section of a window film including a light transmitting substrate 100 and a hard coating layer 200 laminated on one surface of a light transmitting substrate 100 according to an exemplary embodiment.

Since the descriptions of the light transmitting substrate 100 and the hard coating layer 200 shown in FIG. 1 are as described above, detailed descriptions thereof will be omitted.

The manufactured window film for a display device may be used as a window for a display device by adhering the other surface of the light transmitting substrate 100 on which the hard coating layer 200 is not laminated, to a display device through an adhesive film such as PSA and the like.

FIG. 2 is a view showing a schematic cross-section of a window film including a light transmitting substrate 100, a hard coating layer 200, and further including a rear coating layer 300 laminated on the other surface of the light transmitting substrate 100 on which the hard coating layer 200 is not laminated, according to another exemplary embodiment.

In FIG. 2, the light transmitting substrate 100, the hard coating layer 200, and the rear coating layer 300 are the same as aforementioned and thus will not be described in detail.

The window film for a display device according to FIG. 2 is used as a window for a display device by adhering the other surface of the rear coating layer 300 not adhered to the light transmitting substrate 100, to a display device and the like through an adhesive film and the like.

FIG. 3 is a view showing a schematic cross-section of a window film further including an adhesive layer or superelastic layer 400 deposited on the rear coating layer 300 of the window of FIG. 2 according to another exemplary embodiment.

In FIG. 3, the light transmitting substrate 100, the hard coating layer 200, and the rear coating layer 300 are the same as above and thus will not be described in detail.

FIG. 3 shows that the adhesive layer or superelastic layer 400 is laminated on the rear coating layer 300, as illustrated in FIG. 2. Through this adhesive layer or superelastic layer 400, the window film is adhered to a display device and the like and thus may be used as a window for a display device.

The adhesive layer may include a PSA adhesive, while the superelastic layer may include a super elastic material such as polyurethane and polydimethyl siloxane (PDMS), but the present disclosure is not limited thereto.

On the other hand, since the adhesive layer or superelastic layer 400 may cause deterioration of optical characteristics and hardness, thinner layers are preferred. For example, the thickness of the adhesive layer or superelastic layer 400 may be less than or equal to about 50 μm, for example, in a range of about 10 μm to about 40 μm or about 10 μm to about 30 μm, but is not limited thereto.

As illustrated through FIGS. 1 to 3, the window film for a display device according to an embodiment may further include any layer such as the rear coating layer 300 or the adhesive layer or superelastic layer 400 in addition to the light transmitting substrate 100 and the hard coating layer 200 depending on desired use, targeted characteristics, and the like, and accordingly, mechanical properties, optical properties, and/or flexural characteristics of the window for a display device may be further improved or complemented. The window film for a display device according to an embodiment may be manufactured by variously selecting, combining, modifying conventional layers including the aforementioned layers according to desired use and function by those skilled in the related art, and accordingly, these various selections, combinations, and modifications clearly belong to the scope of the present disclosure.

The window film for a display device including the light transmitting substrate 100 and the hard coating layer 200 according to an embodiment may exhibit an average light transmittance of greater than or equal to about 90% in all wavelength ranges of about 360 nm to about 740 nm, a yellowness (YI) of less than about 3, and a haze of less than or equal to 2. In addition, in the window film for a display device according to an embodiment, a rainbow phenomenon on the surface is not seen with the naked eye, but when examined with the naked eye at an incident angle of 45° after adhering the window for a display device to a black color reflector, the rainbow phenomenon is suppressed.

As aforementioned, the window film for a display device including a light transmitting substrate including polyamide and a hard coating layer laminated on one surface of the light transmitting substrate according to an embodiment exhibits a reduced difference of refractive indices between the light transmitting substrate and the hard coating layer and high dispersion properties of the film to suppress interface reflection and generation of an optical interference pattern, and accordingly, optical characteristics and color visibility thereof are improved, and appearance quality thereof may be improved.

Hereinafter, the embodiments will be described in more detail by examples and comparative examples. The following examples and comparative examples are for illustrative purposes and the scope of the present disclosure is not limited thereto.

EXAMPLES

Synthesis Example 1 to Synthesis Example 3: Production of BAPP Based Polyamide Film Synthesis Example 1

86 g of N,N-dimethyl acetamide (DMAc) as a solvent is added to a 200 mL reactor, and 3.18 g of LiCl and 12.9 g of pyridine are added thereto and dissolved therein. 7.495 g (0.9 mole equivalent) of 2,2'-bis(trifluoromethyl)benzidine (TFDB) and 1.068 g of (0.1 mole equivalent) of 2,2-bis[4-(4-aminophenoxy)phenyl]propane (BAPP) as diamine components are injected thereinto and dissolved therein, and 5.437 g (1.0 mole equivalent) of 4,4'-cyclohexyl dicarboxylic acid dichloride (CHDC) as dicarboxylic acid dichloride is added thereto. In addition, 12.9 g of triphenyl phosphine (TPP) is added to the reactor. The reaction proceeds overnight at 40° C.

When the reaction is complete, the polyamide produced therein is precipitated with 2 L of water, pulverized, filtered, and washed with methanol. Subsequently, the polyamide is dried at 100° C. overnight. The obtained polyamide is dissolved in DMAc to have a solid content of 15 wt % to prepare a polyamide solution.

The prepared solution is coated on a glass substrate by using a doctor blade, dried on a 100° C. hot plate for 30 minutes to remove the solvent, and heat-treated in three steps in a nitrogen-purged oven. Specifically, the heat treatment is performed at 140° C. for 5 minutes, at 200° C. for 5 minutes, and at 250° C. for 5 minutes. The cured film through the heat treatment is slowly cooled down to room temperature and then, measured with respect to a thickness, a modulus, transmittance, Y, haze, a refractive index, an Abbe's number, and a glass transition temperature, and the results are shown in Table 1. These are respectively measured in the following methods.

The film thickness is measured by using a micrometer (Mitutoyo).

The yellow index (YI) and transmittance (Tr (%), transmittance in a range of 350 nm to 750 nm) are measured using a Minolta spectrophotometer CM-3600d with a thickness of 50 μm as a reference, respectively and the values thereof are taken as ASTM D1925.

The haze is obtained by using a spectrum colorimeter, CM-3600d made by Minolta Co. Ltd. and taking a value of ASTM D1003-97.

The modulus is obtained by elongating each 10 mm-wide and 50 mm-long film specimen at 0.5 mm/mm/min and room temperature with an Instron 3365 and then, measuring each specimen five times according to the ASTM D882 method and averaging them.

The refractive index is set to a Gen-Osc model in the visible region with an Ellipsometer (M-2000, J. A. Woollam) to take a value at a wavelength of 550 nm.

The Abbe's number is calculated using the following equation:

$$v_D = \frac{(n_{D,589.3} - 1)}{(n_{F,486.1} - n_{C,656.3})} \quad \text{(Equation)}$$

In the equation, $v_D$ denotes an Abbe's number, $\eta_{D,589.3}$ denotes a refractive index at wavelength of 589.3 nm, $\eta_{F,486.1}$ denotes a refractive index at wavelength of 486.1 nm, and $\eta_{C,656.3}$ denotes a refractive index at wavelength of 656.3 nm.

The glass transition temperature (Tg) is measured within a temperature range of 50° C. to 400° C. at a rate of 5° C./min with a fixed tension force of 0.05 N by using a thermal mechanical analyzer (TMA Q400, TA Instruments).

Synthesis Example 2

Polyamide and a film using the same are prepared according to the same method as Synthesis Example 1 except that 0.7 mole equivalent of 2,2'-bis(trifluoromethyl)benzidine (TFDB) and 0.3 mole equivalent of 2,2-bis[4-(4-aminophenoxy)phenyl]propane (BAPP) as the diamine components are reacted with 1.0 mole equivalent of 4,4'-cyclohexyl dicarboxylic acid dichloride (CHDC) as the dicarboxylic acid chloride.

A thickness, a modulus, transmittance, YI, haze, a refractive index, an Abbe's number, and a glass transition temperature of the film are measured in the method described in Synthesis Example 1, and the results are shown in Table 1.

Synthesis Example 3

Polyamide and a film using the same are prepared according to the same method as Synthesis Example 1 except that 0.5 mole equivalent of 2,2'-bis(trifluoromethyl)benzidine (TFDB) and 0.5 mole equivalent of 2,2-bis[4-(4-aminophenoxy)phenyl]propane (BAPP) as the diamine components are reacted with 1.0 mole equivalent of 4,4'-cyclohexyl dicarboxylic acid dichloride (CHDC) as the dicarboxylic acid chloride.

A thickness, a modulus, transmittance, YI, haze, a refractive index, an Abbe's number, and a glass transition temperature of the film are measured in the method described in Synthesis Example 1, and the results are shown in Table 1.

Synthesis Examples 4 to 6: Preparation of APS Based Polyamide Solution

Each polyamide of Synthesis Examples 4 to 6 and each film respectively using the same are prepared according to the same method as Synthesis Example 1 except that 0.1 mole equivalent, 0.3 mole equivalent, or 0.5 mole equivalent of 4,4'-diaminodiphenylsulfone (4-APS) instead of BAPP, along with 0.9 mole equivalent, 0.7 mole equivalent, or 0.5 mole equivalent of 2,2'-bis(trifluoromethyl)benzidine (TFDB) as the diamine components is reacted with 1.0 mole equivalent of 4,4'-cyclohexyl dicarboxylic dichloride (CHDC) as the dicarboxylic chloride.

A thickness, a modulus, transmittance, YI, haze, a refractive index, an Abbe's number, and a glass transition temperature of the film are measured in the method described in Synthesis Example 1, and the results are shown in Table 1.

Synthesis Examples 7 to 9: Preparation of TPE-R Based Polyamide Solution

Each polyamide of Synthesis Examples 7 to 9 and each film respectively using the same are prepared according to the same method as Synthesis Example 1 except that 0.1 mole equivalent, 0.3 mole equivalent, or 0.5 mole equivalent of 1,3-bis(4-aminophenoxy)benzene (TPE-R) instead of BAPP, along with 0.9 mole equivalent, 0.7 mole equivalent, or 0.5 mole equivalent of 2,2'-bis(trifluoromethyl)benzidine (TFDB) as the diamine components is reacted with 1.0 mole equivalent of 4,4'-cyclohexyl dicarboxylic acid dichloride (CHDC) as the dicarboxylic acid chloride.

A thickness, a modulus, transmittance, YI, haze, a refractive index, an Abbe's number, and a glass transition temperature of the film are measured in the method described in Synthesis Example 1, and the results are shown in Table 1.

Comparative Synthesis Example 1

86 g of N,N-dimethyl acetamide (DMAc) as a solvent is added to a 200 mL reactor, and 3.18 g of LiCl and 12.9 g of pyridine are added thereto and dissolved therein. 8.470 g (1.0 mole equivalent) of 2,2'-bis(trifluoromethyl)benzidine (TFDB) as the diamine component is added to the solution and dissolved therein, and 5.530 g (1.0 mole equivalent) of 4,4'-cyclohexyl dicarboxylic acid dichloride (CHDC) as the dicarboxylic acid chloride is added thereto. In addition, 12.9 g of triphenyl phosphine (TPP) is added to the reactor. The reaction proceeded overnight at 40° C.

A resulting material obtained after the reaction is not a solution in which the polyamide is dissolved but a suspension in which the polyamide is suspended. Since a film exhibiting significant optical properties may not be formed from the suspension, a film is not formed and properties thereof are not measured.

Comparative Synthesis Example 2

86 g of N,N-dimethyl acetamide (DMAc) as a solvent is added to a 200 mL reactor, and 3.18 g of LiCl and 12.9 g of pyridine are added thereto and dissolved therein. 8.538 g (1.0 mole equivalent) of 2,2'-bis(trifluoromethyl)benzidine (TFDB) as the diamine component is added to the solution and dissolved therein, and 1.672 g (0.3 mole equivalent) of 4,4'-cyclohexyl dicarboxylic acid dichloride (CHDC) and 3.789 g (0.7 mole equivalent) of terephthalic chloride (TPCl) as the dicarboxylic acid dichloride are added thereto. In addition, 12.9 g of triphenyl phosphine (TPP) is added to the reactor. The reaction is allowed to proceed overnight at 40° C.

A resulting material obtained after the reaction is obtained in a form that the prepared polyamide is not dissolved but precipitated. The precipitation means that the polyamide is not dissolved and thus not prepared as a solution and accordingly, not polymerized into a polymer having an appropriate molecular weight. Accordingly, a film is difficult to form therefrom, and thus properties thereof are difficult to measure.

Comparative Synthesis Example 3-Polyimide 102 g of N,N-dimethyl acetamide (DMAc) as a solvent is a 200 mL reactor, and 9.670 g (0.8 mole equivalent) of 6FDA (4,4'-(hexafluoroisopropylidene)diphthalic anhydride) and 1.602 g (0.2 mole equivalent) of BPDA (3,3',4,4'-biphenyl tetracarboxylic dianhydride) as the dicarboxylic anhydride are injected into the solvent and dissolved therein. When the injection is complete, the solution is reacted for 24 hours to prepare a polyamic acid solution.

6.5 g of pyridine and 8.3 g of acetic anhydride are injected into the solution and then, stirred for 24 hours to complete chemical imidization and then, form a film according to the same procedure as Synthesis Example 1. A thickness, a modulus, transmittance, YI, haze, a refractive index, an Abbe's number, and a glass transition temperature of the film are measured in the method described in Synthesis Example 1, and the results are shown in Table 1.

Comparative Synthesis Example 4-Polyamideimide 102 g of N,N-dimethyl acetamide (DMAc) as a solvent is added to a 200 mL reactor, 11.175 g (1.0 mole equivalent) of 2,2'-bis(trifluoromethyl)benzidine (TFDB) as the diamine component is added thereto and dissolved therein, and 2.325 g (0.15 mole equivalent) of 6FDA (4,4'-(hexafluoroisopropylidene)diphthalic anhydride) and 1.542 g (0.15 mole equivalent) of BPDA (3,3',4,4'-biphenyl tetracarboxylic dianhydride) as the dicarboxylic anhydride are injected into the solvent. When the injection is complete, the solution is reacted for 8 hours to prepare a polyamic acid solution. Subsequently, 4.959 g (0.7 mole equivalent) of TPCl is added to the solution and then, further reacted for 24 hours to obtain a poly(amic acid-amide) copolymer.

0.8 g of pyridine and 3.2 g of acetic anhydride are added to the solution and then, further stirred for 24 hours to complete chemical imidization and thus obtain a poly(imide-amide) copolymer solution and then, formed into a poly(imide-amide) copolymer film through the same procedure as Synthesis Example 1. A thickness, a modulus, a transmittance, a YI, a haze, a refractive index, an Abbe's number, and a glass transition temperature of the film are measured in the method described in Synthesis Example 1, and the results are shown in Table 1.

TABLE 1

| | Composition [mol %] | | | | | | | | Polymerization |
|---|---|---|---|---|---|---|---|---|---|
| | BPDA | 6FDA | CHDC | TPCl | TFDB | 4-APS | BAPP | TPE-R | results |
| Synthesis Example1 | | | 100 | | 90 | | 10 | | Good |
| Synthesis Example2 | | | 100 | | 70 | | 30 | | Good |
| Synthesis Example3 | | | 100 | | 50 | | 50 | | Good |
| Synthesis Example4 | | | 100 | | 90 | 10 | | | Good |
| Synthesis Example5 | | | 100 | | 70 | 30 | | | Good |
| Synthesis Example6 | | | 100 | | 50 | 50 | | | Good |
| Synthesis Example7 | | | | 100 | 90 | | | 10 | Good |
| Synthesis Example8 | | | | 100 | 70 | | | 30 | Good |
| Synthesis Example9 | | | | 100 | 50 | | | 50 | Good |
| Comparative Synthesis Example1 | | | 100 | 100 | | | | | Suspension |
| Comparative Synthesis Example2 | | | 30 | 70 | 100 | | | | Precipitation |
| Comparative Synthesis Example3 | 20 | 80 | | | 100 | | | | Good |
| Comparative Synthesis Example4 | 15 | 15 | | 70 | 100 | | | | Good |

| | Thickness (um) | Modulus (GPa) | Transmittance (%) | YI (—) | Haze (%) | Refractive index@550 nm | Abbe No. | Tg (° C.) |
|---|---|---|---|---|---|---|---|---|
| Synthesis Example1 | 54 | 4.8 | 88.3 | 3.7 | 0.6 | 1.602 | 24.1 | 335 |
| Synthesis Example2 | 56 | 3.7 | 88.0 | 3.5 | 0.5 | 1.623 | 24.3 | 335 |
| Synthesis Example3 | 50 | 3.5 | 88.2 | 3.2 | 0.8 | 1.631 | 24.6 | 331 |
| Synthesis Example4 | 46 | 5.0 | 87.6 | 3.3 | 0.9 | 1.652 | 21.8 | 356 |
| Synthesis Example5 | 58 | 4.5 | 89.7 | 1.2 | 0.5 | 1.636 | 22.1 | 352 |
| Synthesis Example6 | 74 | 3.5 | 89.5 | 1.7 | 0.6 | 1.616 | 22.1 | 358 |
| Synthesis Example7 | 53 | 5.2 | 88.2 | 3.1 | 0.8 | 1.621 | 21.1 | 357 |
| Synthesis Example8 | 53 | 4.3 | 88.7 | 2.7 | 0.8 | 1.638 | 22.9 | 355 |
| Synthesis Example9 | 54 | 3.8 | 89.0 | 2.4 | 0.9 | 1.642 | 23.1 | 350 |
| Comparative Synthesis Example1 | — | — | — | — | — | — | — | — |
| Comparative Synthesis Example2 | — | — | — | — | — | — | — | — |
| Comparative Synthesis Example3 | 53 | 4.1 | 89.1 | 2.0 | 0.8 | 1.63 | 18.2 | 330 |
| Comparative Synthesis Example4 | 50 | 6.2 | 88.7 | 2.8 | 0.9 | 1.731 | 16.1 | 353 |

As shown in Table 1, in Synthesis Examples 1 to 4 wherein the polyamide is prepared by using CHDC including a cycloalkylene group as the dicarboxylic acid dichloride and a mixture of TFDB and diamine formed by linking two or more phenylene groups like —O—, —SO$_2$—, —C(CH$_3$)$_2$—, or a combination thereof, a polymerization reaction satisfactorily proceeds to produce a polyamide film therefrom. In addition, a film formed therefrom has an elastic modulus of greater than or equal to about 3.5 GPa and thus exhibits excellent mechanical properties. In addition, the films have a transmittance of greater than or equal to about 88%, a YI of less than or equal to about 3.7, haze of less than about 1, and a refractive index of less than about 1.66 and thus exhibits excellent optical properties. Furthermore, these films all have an Abbe's number of greater than about 20, which is much higher than that of polyimide obtained by using aromatic carboxylic dianhydride and aromatic diamine according to Comparative Synthesis Example 3 or a poly(amide-imide) copolymer obtained by using aromatic carboxylic dianhydride, aromatic diamine, and aromatic dicarboxylic chloride according to Comparative Synthesis Example 4. In addition, the films of the synthesis examples all have glass transition temperatures of greater than 330° C. and thus have high heat resistance.

However, when polyamide is prepared by including either 100 mol % of CHDC as dicarboxylic acid dichloride, and also, a diamine including 90 mol % of TFDB having a rigid structure and 10 mol % of BAPP, 4-APS, or TPE-R having two or more phenylene groups linked by a linking group such as —O—, —SO$_2$—, and —C(CH$_3$)$_2$— somewhat flexible structure is imparted (Synthesis Examples 1, 4 and 7). Thus, a polymerization reaction satisfactorily proceeds, mechanical properties are increased, transmittance, haze, a refractive index, an Abbe's number, a glass transition temperature, and the like are all maintained within excellent ranges. However, as a content of the diamine having a rigid structure, that is, TFDB, is relatively increased, polymers are further packed, formation of an electron transporter (CTC: Carrier Transfer Complex) among the polymers is promoted, and thus the yellow index (YI) may be slightly increased.

On the contrary, when polyamide is prepared by using 100 mol % of CHDC as the dicarboxylic acid dichloride and also, a diamine including 50 mol % of TFDB having a rigid structure and 50 mol % of BAPP, 4-APS, or TPE-R BAPP, 4-APS, or TPE-R having two or more phenylene groups linked by a linking group such as —O—, —SO$_2$—, and —C(CH$_3$)$_2$— some flexibility is imparted into the structure (Synthesis Examples 3, 6, and 9). Transmittance, Y, haze, a refractive index, an Abbe's number, a glass transition temperature, and the like are all maintained within excellent ranges, but as the content of TFDB having the rigid structure is relatively decreased, mechanical properties are a little deteriorated.

On the other hand, as for Comparative Synthesis Example 1 wherein 100 mol % of CHDC as the dicarboxylic chloride is reacted with 100 mol % of TFDB as the diamine, as described above, the resulting solution is not a clear solution but a suspension, and accordingly, a film having excellent optical properties may not be obtained.

In addition, as for Comparative Synthesis Example 2 wherein a mixture of 30 mol % of CHDC as the aromatic dicarboxylic acid dichloride and 70 mol % of terephthalic dichloride (TPCl) as the dicarboxylic acid dichloride is mixed with 100 mol % of TFDB as the diamine, as described above, a polymer obtained therefrom is not soluble in a solvent but is precipitated. In other words, the insolubility of the polymer obtained through a polymerization reaction means that the polymerization reaction does not proceed smoothly.

Based on these results, the polymerization reaction may be facilitated by using dicarboxylic chloride including a cycloalkylene group as the dicarboxylic acid dichloride and a mixture of diamine including a phenylene group and having a rigid structure and diamine including a phenylene group and having a flexible structure each in an appropriate amount. The polymerized polyamide has a low refractive index, a high Abbe's number, and high heat resistance as well as excellent mechanical properties and optical properties and in addition, decreased interface interference thereof with a hard coating layer disposed thereon and thus may provide a window for a display device having improved visibility.

Preparation Example 1: Preparation of Solution for Forming Hard Coating Layer

Preparation Example 1-1: Preparation of Silsesquioxane 20 ml of ethanol (Samchun Chemicals) and 17.5 g of 1 wt %-diluted tetramethylammonium hydroxide solution (TMAH: Sigma-Aldrich) solution are added to 100 ml double jacketed reaction vessel and mixed. 26.5 ml of (3-glycidyloxypropyl)trimethoxysilane (Sigma-Aldrich) is added with mixing and the reaction proceeded at room temperature for 6 hours. Subsequently, the temperature is increased up to 60° C., and 40 ml toluene (Sigma-Aldrich) is added to the mixture and mixed for 6 hours. When the reaction is complete, the reaction product solution is washed using a saturated sodium chloride solution (Samchun Chemicals), and the remaining moisture is removed using sodium sulfate anhydrous (Samchun Chemicals). Subsequently, the residue solvent such as toluene remained in the reaction product is removed using an evaporator (Daihan Scientific Co., Ltd.) and a vacuum oven (Daihan Scientific Co., Ltd.).

Preparation Example 1-2: Preparation of Silsesquioxane 20 ml of ethanol (Samchun Chemicals) and 17.5 g of 1 wt %-diluted tetramethylammonium hydroxide (TMAH, Sigma-Aldrich) solution are added to 100 ml double jacketed reaction vessel and mixed. With mixing, 18.2 ml of [8-(Glycidyloxy)-n-octyl]trimethoxysilane (TCI) is added thereto and the reaction proceeded at room temperature for 6 hours. Subsequently, the temperature is increased up to 60° C., and 40 ml of toluene (Sigma-Aldrich) is added to the mixture and mixed for 6 hours. When the reaction is complete, the reaction product solution is washed using a saturated sodium chloride solution (Samchun Chemicals), and the remaining moisture is removed using sodium sulfate anhydrous (Samchun Chemicals). The remaining solvent such as toluene is removed using an evaporator (Daihan Scientific Co., Ltd.) and a vacuum oven (Daihan Scientific Co., Ltd.).

Preparation Example 1-3: Preparation of Hard Coating Solution

Silsesquioxane obtained from Preparation Example 1-1, silsesquioxane obtained from Preparation Example 1-2, and a cation polymerizable organic compound represented by Chemical Formula A are added to methylisobutylketone in a weight ratio of 40:40:20 and stirred. Herein, the amount (solid content) of silsesquioxane obtained from Preparation Example 1-1, silsesquioxane obtained from Preparation Example 1-2, and a cation polymerizable organic compound represented by Chemical Formula A is 50% based on a total weight of the solution. A cation initiator (Irgacure 250, BASF) is added thereto in an amount of 2 parts by weight based on 100 parts by weight of the solids, and a surface characteristic controlling agent (KY-1203, Shin-Etsu) is added thereto in an amount of 0.1 parts by weight based on 100 parts by weight of the solids and uniformly mixed to provide a hard coating solution.

Chemical Formula A

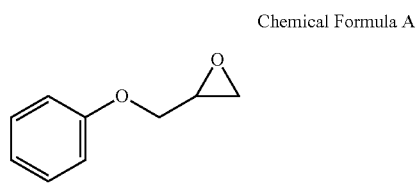 [SMILES: c1ccc(OCC2CO2)cc1]

A refractive index of the hard coating layer made from the hard coating solution prepared according Preparation Example is 1.5. The refractive index is set to the Gen-Osc model in a visible region with an Ellipsometer (M-2000, J. A. Woollam), and the value at a wavelength of 550 nm is measured.

Examples 1 to 3 and Comparative Examples 1 and 2: Production and Evaluation of Window Film for Display Device The hard coating solutions of Preparation Examples 1 to 3 are respectively bar-coated on each polyamide film according to Synthesis Examples 3, 6, and 9, treated in a drying oven to remove a solvent, and cured with 380 mJ/cm² by using UV curing equipment (LC6B, Fusion UV Systems, Inc.) to form window films having a 7 μm-thick hard coating layer according to Examples 1, 2, and 3.

Optical properties and specifically, a transmittance, a yellow index (YI), and a haze of the obtained window films are measured in the method described in Synthesis Example 1, a rainbow mura thereof is examined with the naked eye, and the results are shown in Table 2. A specific method of measuring the rainbow mura, a degree of the rainbow mura is evaluated as "strong", "weak", and "no (mura)" by unifying the surface of the window having the hard coating layer and the opposite surface thereof in order to prevent reverse reflection of the window film to a black acrylic plate by using 50 μm PSA commercially available from 3M and then, examining the hard coating layer surface of the window with the naked eye under a three wave length lamps.

On the other hand, window films for a display device according to Comparative Examples 1 and 2 are respectively manufactured by forming a 7 μm-thick hard coating layer on each polyimide film and poly(amide-imide) film according to Comparative Synthesis Examples 3 and 4 according to the same method as Example 1 and in addition, a 50 μm-thick PSA layer on the opposite surface to the surface having the hard coating layer. The window films according to Comparative Examples 1 and 2 are measured with respect to optical characteristics and a rainbow mura according to the same method as Example 1, and the results are shown in Table 2.

TABLE 2

| | Film composition [mol %] | | | | | | | | Hard coating | Transmittance (%) | YI (—) | Haze (%) | Degree of mura |
|---|---|---|---|---|---|---|---|---|---|---|---|---|---|
| | BPDA | 6FDA | CHDC | TPCI | TFDB | 4-APS | BAPP | TPE-R | | | | | |
| Example 1 | | | 100 | | 50 | | 50 | | Good | 90.2 | 3.0 | 0.9 | None |
| Example 2 | | | 100 | | 50 | 50 | | | Good | 91.1 | 2.0 | 0.6 | None |
| Example 3 | | | | | 50 | | | 50 | Good | 91.3 | 2.6 | 0.8 | None |
| Comparative Example 1 | 20 | 80 | | | 100 | | | | Good | 91.0 | 2.2 | 0.9 | Weak |
| Comparative Example 2 | 15 | 15 | | 70 | 100 | | | | Good | 90.3 | 3.1 | 0.6 | Strong |

As shown in Table 2, the window films according to Examples 1 to 3 exhibit almost no rainbow mura as well as a transmittance of greater than or equal to 90%, a YI of less than or equal to 3, and a haze of less than 1 and thus provides excellent optical properties. On the contrary, the windows according to Comparative Examples 1 and 2 exhibit a weak or strong rainbow mura despite excellent optical properties such as transmittance, YI, haze, and the like.

As shown in examples and comparative examples hereinbefore, in a film including polyamide prepared from the dicarboxylic acid derivative including the cycloalkylene group and the diamine including the phenylene group as a light transmitting substrate and laminating the hard coating layer thereon according to an embodiment. The light transmitting substrate including the polyamide has a low refractive index and a high Abbe's number and thus exhibits a reduced difference of a refractive index from that of the hard coating layer, interface reflection and light interference are reduced, generation of a rainbow mura is suppressed, and accordingly, color visibility and appearance quality are excellent. Accordingly, the window film according to an embodiment may be usefully used as a window film of a display device requiring excellent appearance quality.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:
1. A window film for a display device, comprising a light transmitting substrate comprising a polyamide comprising a structural unit represented by Chemical Formula 1 and a structural unit represented by Chemical Formula 2 and a hard coating layer laminated on one surface of the light transmitting substrate:

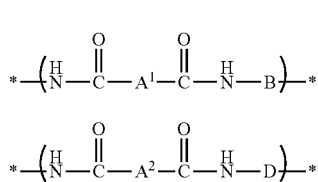

(Chemical Formula 1)

(Chemical Formula 2)

wherein, in Chemical Formula 1 and Chemical Formula 2,
$A^1$ and $A^2$ are each independently a C4 to C10 cycloalkylene group, or a group in which two C4 to C10 cycloalkylene groups are linked by a single bond,
B of Chemical Formula 1 is a group comprising two phenylene groups that are linked by a single bond and each of the two phenylene groups is substituted with an electron withdrawing group, and
D of Chemical Formula 2 is a group in which two or more substituted or unsubstituted phenylene groups are linked by —O—, —S—, —C(=O)—, —(CF$_2$)$_q$—, —C(C$_n$H$_{2n+1}$)$_2$—, —C(C$_n$F$_{2n+1}$)$_2$—, (wherein 1≤n≤10 and 1≤q≤10), or a combination thereof;
wherein the structural unit represented by Chemical Formula 1 is present in an amount of greater than or equal to 50 mol % and less than or equal to 75 mol % based on a total mole number of the structural unit represented by Chemical Formula 1 and the structural unit represented by Chemical Formula 2.

2. The window film of claim 1, wherein $A^1$ and $A^2$ of Chemical Formula 1 and Chemical Formula 2 are each independently a single cyclohexylene group, a group in which two cyclohexylene groups are linked by a single bond, or a decahydronaphthalenylene group.

3. The window film of claim 1, wherein B of Chemical Formula 1 is represented by the following chemical formula:

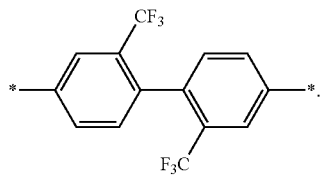

4. The window film of claim 3, wherein the light transmitting substrate has at least three of the following properties;
a refractive index of greater than or equal to about 1.60 and less than about 1.66,
an Abbe's number of greater than or equal to about 22,
an average transmittance in a wavelength range of about 360 nm to about 740 nm of greater than or equal to about 88%,
an elastic modulus of greater than or equal to about 3.3 GPa, or
a glass transition temperature of greater than or equal to about 320° C.

5. The window film of claim 1, wherein D of Chemical Formula 2 is a group in which two or more substituted or unsubstituted phenylene groups are linked by —O—, —C(C$_n$H$_{2n+1}$)$_2$—, —C(C$_n$F$_{2n+1}$)$_2$— or a combination thereof, wherein 1≤n≤4.

6. The window film of claim 1, wherein D of Chemical Formula 2 is a group represented by the following chemical formulae:

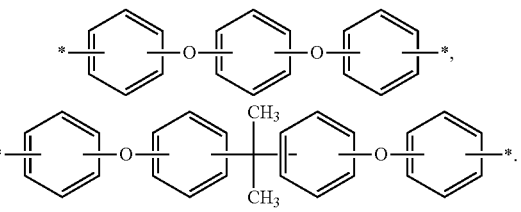

7. The window film of claim 1, wherein the structural unit represented by Chemical Formula 1 is present in an amount of greater than or equal to about 55 mol % and less than or equal to about 75 mol % based on a total mole number of the structural unit represented by Chemical Formula 1 and the structural unit represented by Chemical Formula 2.

8. The window film of claim 1, wherein the structural unit represented by Chemical Formula 1 is present in an amount of greater than or equal to about 60 mol % and less than or equal to about 75 mol % based on a total mole number of the structural unit represented by Chemical Formula 1 and the structural unit represented by Chemical Formula 2.

9. The window film of claim 1, wherein the light transmitting substrate has a refractive index of greater than or equal to about 1.60 and less than about 1.66 and an Abbe's number of greater than or equal to about 20.

10. The window film of claim 1, wherein the light transmitting substrate has an average transmittance in a wavelength range of about 360 nm to about 740 nm of greater than or equal to about 88%.

11. The window film of claim 1, wherein the light transmitting substrate has an elastic modulus of greater than or equal to about 3 GPa.

12. The window film of claim 1, wherein the light transmitting substrate has a glass transition temperature of greater than or equal to about 300° C.

13. The window film of claim 1, wherein the hard coating layer comprises an acrylate-based polymer, a urethane-based polymer, an epoxy-based polymer, a silicone-based polymer, polycaprolactone, a urethane-acrylate copolymer, polyrotaxane, a silica-containing inorganic hard coating material, or a combination thereof.

14. The window film of claim 13, wherein the hard coating layer includes the silicone-based polymer, the silicone-based polymer comprising an organopolysiloxane.

15. The window film of claim 1, wherein the light transmitting substrate has thickness of about 10 μm to about 300 μm.

16. The window film of claim 1, wherein a hard coating layer has a thickness of about 1 μm to about 30 μm.

17. The window film of claim 1, wherein the window film further comprises a rear coating layer on the other surface of the light transmitting substrate on which the hard coating layer is not laminated.

18. The window film of claim 1, wherein the window film has an average transmittance in a wavelength range of about 360 nm to about 740 nm of greater than or equal to about 90%.

19. A display device comprising the window film of claim 1.

20. A display device of claim 19, wherein the display device is a flexible display device.

* * * * *